US008177189B2

(12) United States Patent
Jackson et al.

(10) Patent No.: US 8,177,189 B2

(45) Date of Patent: May 15, 2012

(54) FIRE PROTECTION CONTROL VALVE WITH ROTATING PLUG

(75) Inventors: Eldon D. Jackson, Hastings, MI (US); Vinh B. Hoa, Kentwood, MI (US)

(73) Assignee: The Viking Corporation, Hastings, MI (US)

( * ) Notice: Subject to any disclaimer, the term of this patent is extended or adjusted under 35 U.S.C. 154(b) by 1340 days.

(21) Appl. No.: 11/556,847

(22) Filed: Nov. 6, 2006

(65) Prior Publication Data

US 2008/0105440 A1 May 8, 2008

(51) Int. Cl.
*F16K 31/44* (2006.01)

(52) U.S. Cl. ................................ 251/73; 169/20; 251/94

(58) Field of Classification Search .................. 251/177, 251/94, 73, 305; 169/17, 5, 8, 19, 20, 21, 169/22, 23; 137/557
See application file for complete search history.

(56) References Cited

U.S. PATENT DOCUMENTS

| | | | | |
|---|---|---|---|---|
| 515,410 | A | 2/1894 | Thomson | |
| 1,762,009 | A * | 6/1930 | Carlson | 169/23 |
| 2,251,422 | A | 8/1941 | Rider | |
| 2,356,990 | A | 8/1944 | Getz | |
| 3,575,376 | A | 4/1971 | Arvidson, Jr. | |
| 3,623,696 | A | 11/1971 | Baumann | |
| 3,864,031 | A | 2/1975 | Hossfeld et al. | |
| 3,885,771 | A | 5/1975 | Baumann | |
| 4,073,473 | A | 2/1978 | Rihm et al. | |
| 4,256,285 | A | 3/1981 | Davidson | |
| 4,519,579 | A | 5/1985 | Brestel et al. | |
| 4,640,492 | A | 2/1987 | Carlson, Jr. | |
| 4,706,706 | A | 11/1987 | Page et al. | |
| 5,244,011 | A | 9/1993 | Feldinger et al. | |
| 5,305,987 | A | 4/1994 | Baumann | |
| 5,634,626 | A | 6/1997 | Hartman | |
| 5,822,984 | A | 10/1998 | Park et al. | |
| 5,934,645 | A | 8/1999 | Calvin | |
| 6,068,057 | A | 5/2000 | Beukema | |
| 6,557,645 | B1 | 5/2003 | Ringer | |
| 6,810,963 | B2 | 11/2004 | Ringer | |

FOREIGN PATENT DOCUMENTS

DE 3843064 6/1990

* cited by examiner

*Primary Examiner* — John Fristoe, Jr.
*Assistant Examiner* — Andrew J Rost
(74) *Attorney, Agent, or Firm* — Harness, Dickey & Pierce, P.L.C.

(57) ABSTRACT

A differential dry pipe control valve for fire protection sprinkler systems includes an eccentric plug that rotates and separates supply water and system air pressure and uses an integral actuator that maintains the seal of the eccentric plug with a smaller ratio of air pressure to a higher supply water pressure. When the sprinkler system is actuated, the actuator allows the rotary eccentric plug to open the waterway and includes an eccentric plug opening that swings out of the waterway to reduce friction loss of the water supply. The eccentric plug includes a conical rubber coated seat surface and dynamic metal seal seat that seals due to water pressure eliminating close tolerance mating of sealing components. The actuator includes an integral alarm connection to provide a required alarm function and acts as a pilot differential actuator to provide the required operation of an approximately 5.5:1 ratio differential dry pipe control valve. This valve can also function as an open system Deluge valve or closed system Preaction valve for sprinkler systems that operate from separate detection systems where the supply liquid holds the valve closed until a detection system detects a fire and signals the deluge valve to open for discharge of suppressant liquid on the protected fire area.

21 Claims, 13 Drawing Sheets

FIRE PROTECTION CONTROL VALVE WITH ROTATING PLUG

FIELD

The present disclosure relates to a fire protection control valve and more particularly to a fire protection differential control valve with eccentric plug and dynamic seat.

BACKGROUND

The statements in this section merely provide background information related to the present disclosure and may not constitute prior art.

Dry pipe sprinkler systems used in fire protection typically are applied in unheated occupancies and structures that may be exposed to freezing temperatures. The dry pipe system is connected using a differential control valve that will hold back a high pressure water supply against a low pressure air supply that is used in the system to supervise the integrity of the sprinkler system piping. A dry pipe control valve must operate on the loss of air pressure in the system due to operation of a fusible link sprinkler that operates due to a fire condition. The lower air pressure must also hold the dry pipe control valve closed against the higher pressure water supply.

Dry pipe control valves are typically designed as swing type valves including a clapper that pivots about an axis parallel to the flow axis and require ratios of differential areas of the annular water seat to the annular air seat of typically 5.5:1. Also, the friction loss of supply water through the dry pipe control valve is required to meet regulatory parameters that inherently require the valve water supply seat and outer housing to be large. In particular, existing regulations require the low pressure air seat to be 5.5 times larger than the water seat effective area resulting in a very large control valve. The dry pipe control valve is required to be located in a heated portion of the protected building structure where the water supply up to the control valve will not freeze. The system discharge piping is maintained with the required air or gas pressure to keep the dry pipe control valve shut until a fire condition occurs where a fused sprinkler will operate or open due to a rise in temperature above its designed operating temperature. When the sprinkler opens the air pressure within the dry pipe system is lowered to an operation point or pressure of the dry pipe control valve where the water pressure overcomes the air supply pressure and allows the dry pipe control valve to open. At this point, water flows through the control valve to the open piping system and the operated sprinklers and water is thereby discharged on the fire area being protected.

Dry pipe control valves currently used have been of the single swing type clapper design where the pivot point is offset from the center of the concentric annular seat. The air seat is concentric or eccentric from the water seat and a double seat is required, one for supply water and a larger seat for air or gas on the system discharge side of the valve. A space between the air and supply water seat is an intermediate space that maintains atmospheric pressure. The complete clapper must swing upward with the flow of water through the valve. This requires the valve body to be very large compared to the supply waterway to accommodate the large area for the air seat compared to the water seat for the operation of the 5.5:1 differential area (which is an industry standard) and requires a large valve body area for the clapper to swing out of the waterway to prevent large friction losses in a flowing condition. The 5.5:1 differential area ratio is the relationship of the mean air seat annular area divided by the mean water seat annular area. Also in some valve designs the distance to the pivot point of the clapper versus the centerline of the water seat versus the air seat area must also be factored in to the differential ratio. In the case of a current differential dry pipe control valve design for a 6" diameter water seat valve using a 5.5 ratio (industry standard) the air seat is required to have a 14 inch diameter and the valve body must be larger to accommodate the body wall, proper clearances and assembly flanges. This makes the dry pipe control valve very large, heavy and difficult to install.

In another application, fire protection deluge or flow control valves are applied where the system discharge piping and discharge devices are open (or possibly closed) and air or gas is used to supervise the piping for preaction systems. The valves are smaller, using a lower differential to hydraulically maintain the valve closed and using the supply water pressure for supplying a priming pressure to a back side of the valve for holding the valve closed, and the air or gas is connected through a releasing device connected to a smoke, flame or heat detection and releasing control system. In the event of a fire, the detection system sends a signal to a release control panel that signals a solenoid valve to open and thus releases the priming pressure from the hydraulic actuator that latches the main deluge or flow control valve closed. In this type of fire protection valve currently in use, a clapper and diaphragm directly in line with the annular seat and piping inlet is applied with the priming supply pressure on the top of the actuator that is larger than the supply seat by typically a 2:1 ratio. As the liquid priming pressure is released, the hydraulic force on the clapper or actuator is released and the valve unlatches, in a swing-type valve, or the clapper rises to allow flow through the valve. For the swing-type clapper the valve only opens full or closes with no control of the flow. In the diaphragm-type clapper where the clapper moves vertical to open, and supply liquid flows past to an outlet, the upper prime chamber pressure can be regulated to maintain a desired position of the clapper to control the flow of the discharge liquid or to automatically close the valve when desired. In this type of valve, the pressure loss is typically high and the valve body must be large to accommodate the maximum allowed pressure loss required by the industry.

Eccentric rotating plug valves are currently used in the process industry where operation is continuous and regulations of operation are based on hydraulic or pneumatic actuators or on manual actuation. The eccentric rotating plug valves typically include a separate motive system source other than the system being controlled. The actuator force utilized to seal the plug and seat is maintained with a pneumatic actuator or hydraulic system with the actuator rotating the plug and forcing the plug into the annular seat to result in a sealed tight connection. Most eccentric rotating plug valves require very tight tolerances to maintain a positive seal over time and numerous operations.

In fire protection valves, the pressure loss through the system control valve is regulated. Also, the operating torque for an efficient plug valve must be low, in order to maintain accurate control of the actuator for operation due to loss of system pressure while using the supply liquid of the system to open the valve. Use of eccentric plug valves where the plug rotating shaft centerline is offset from the seat centerline allows for a longer lasting plug and seat due to elimination of scrubbing of the seal surfaces during opening and closing of the valve. This typically requires close tolerances of the plug to seat and centerline locations to consistently maintain a proper seal on the valve. In addition to the close tolerance requirements, the load on the seat must be constant to maintain the seal of the seat and plug, with the load coming from an actuator or manual lever that is latched. Where external actuators and control systems are applied, the operating torque of the plug valve is not critical to operation due to the potential of power applied from the external actuator sources.

For fire protection valves, the control of opening the clapper or rotating plug for the subject valve is critical to the consistent operation over the life of the valve installation and for the variable system operating pressures provided. Also, fire protection valves are installed and put in service for many years and only operate a couple times each year for verification of operation and proper leak tight sealing. These operating conditions are difficult to account for in a control valve design due to corrosion and brackish water combined with the presence of air in the fire protection systems.

Rotating plug valves currently applied in the process industry typically operate continuously and are less susceptible to sticking or corroding closed. Also, they do not typically use the flow medium they control as the mechanism for operation. Fire protection deluge or dry pipe valves are required to operate when a fire occurs and are non dependent on external power sources. A fire protection control valve must operate based on the potential of fire in all situations even in non controlled situations where the only power available to operate the systems comes from the liquid supply and the loss of supervisory pressure in the discharge system piping.

Generally, eccentric rotating plug valve designs include a fixed annular seat and plug seal where rotation of the plug along with a rotational force generates the sealed connection between the annular seat and the solid plug in the liquid passage of the valve housing.

SUMMARY

The present disclosure provides a fire protection control valve having an eccentric plug and a dynamic seat for providing a pressure generated seal on the seat and plug. The design provides reduced tolerance, improved seal over variable pressure ranges and a reduced seating torque to complete a proper seal on the seat to plug connection to shut off the valve.

The present disclosure includes a differential pressure fire protection dry pipe control valve that includes an annular inlet waterway equal to the pipe size attached to the supply and discharge of the fire protection sprinkler system. The sealing component includes an eccentric rotating plug seat that has an axis that is perpendicular to the axis of the waterway. The axis of the rotating plug is also offset away from the rotation direction approximately ¼" from the annular axis of the waterway seat in order to provide a non-scrubbing action to seal the plug against the water supply seat.

The waterway seat is dynamic in the aspect that the plug seal compresses the dynamic seat by compressing a wave spring just enough to generate the initial seal. The inlet water supply creates the final seal due to water pressure forcing the seat against the plug elastomer coated sealing surface creating the final seal of liquid or gas supply pressure.

The rotating plug is also forced to open using a torsion spring and a coupling that latches the plug in the closed position for a differential dry valve or an axial piston and linkage assembly to rotate the stem and plug assembly in a controlled position. The differential dry pipe control valve actuator includes a coupling that contains the spring and is attached to an actuator that includes a vertical load supplied by down stream air pressure that forces the plunger downward toward the valve rotating plug shaft and coupling holding the valve closed and mechanically latched. This causes the plug to remain closed as long as the air pressure in the outlet to the system remains within a proper range. The integral actuator includes an operating differential pressure ratio of air to water supply of approximately 5.5:1 where the air pressure area of the actuator is approximately 5.5 times larger than the water supply area. The actuator is connected to the water supply on the bottom and the supervisory air supply to the system on the top side.

For a fire protection dry pipe system when a fused sprinkler overheats and opens due to a fire situation, the supervisory air pressure in the system lowers and when the pressure drops to a predetermined pressure at approximately 5.5:1 compared to the water supply pressure the actuator rises disengaging the torsion coupling from the latch and allowing the torsion spring to rotate the plug seat 90 degrees away from the annular waterway to a full open position allowing liquid or gas fire suppressant to flow to the discharge of the system and discharge liquid from the open sprinkler onto the fire area.

The actuator of the present disclosure is integral with the rotating valve body and plug assembly and provides the proper differential ratio of operation as a sprinkler system dry pipe valve where the supervisory air or gas pressure is approximately 5.5 times lower than the liquid fire suppressant pressure that the rotating plug and seat combination is sealing leak tight.

The present dry pipe differential control valve design includes an actuator that incorporates a diaphragm on the low pressure system supervisory gas side. This diaphragm provides an effective area of approximately 5.5 times larger than the liquid seat area opposite of the gas diaphragm area integral of the actuator. The liquid seat of the actuator includes an effective area 5.5 times smaller than the effective area of the gas area creating the proper sensing ratio to seal the liquid supply connected to the inlet supply side of the valve. When a sprinkler opens due to the fused actuator caused from a fire or over heated condition the gas pressure in the supervisory system side is lowered and when the differential between the effective actuator areas reach the 5.5:1 point the actuator rises due to higher liquid pressure on the underside of the diaphragm an supply liquid forces the actuator axially outward causing the latched coupling to unlatch causing the torsion spring to force the rotating plug to rotate 90 degrees away from the annular seat allowing liquid to flow to the open sprinkler system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
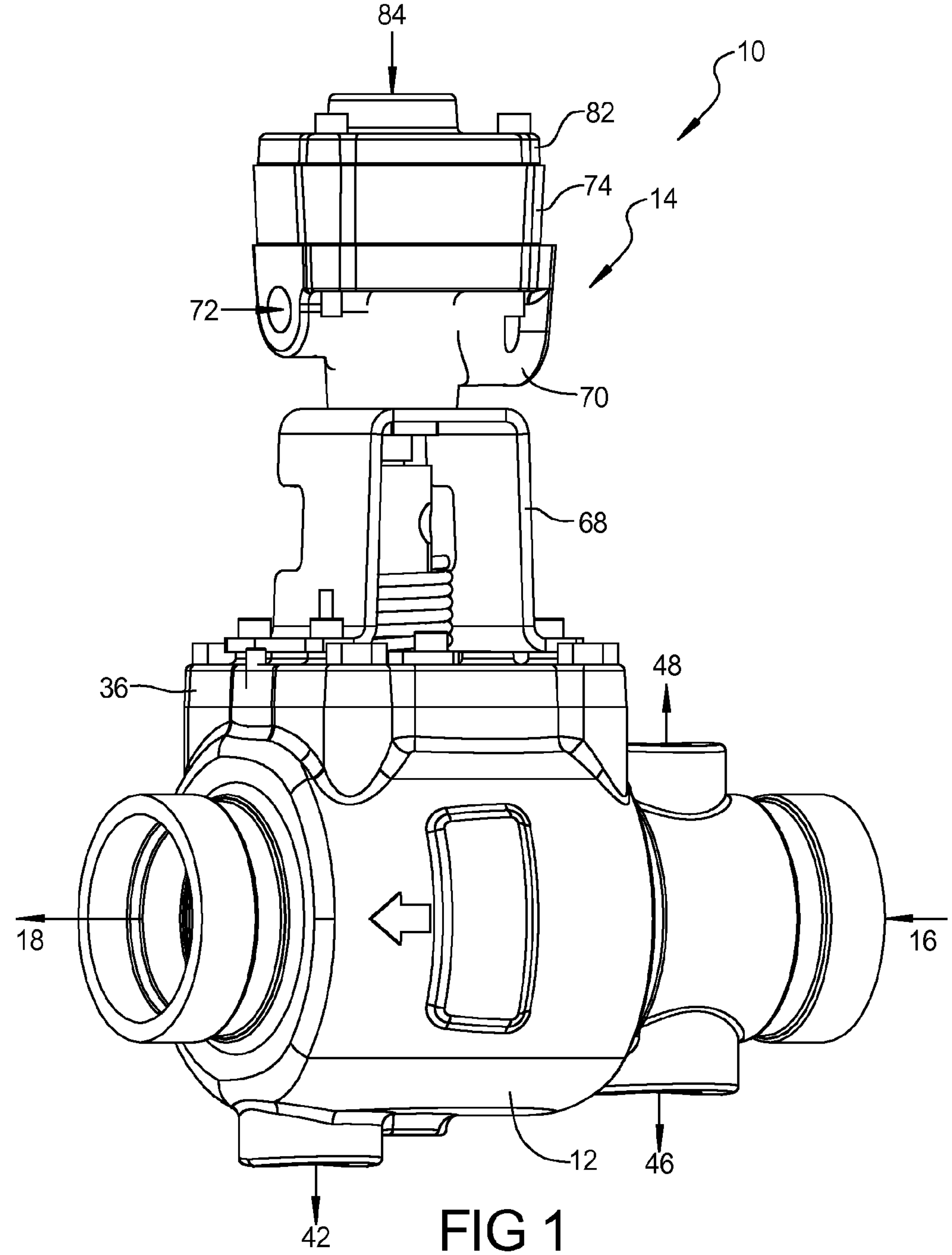
FIG. 1 is a perspective view of the fire protection control valve assembly according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
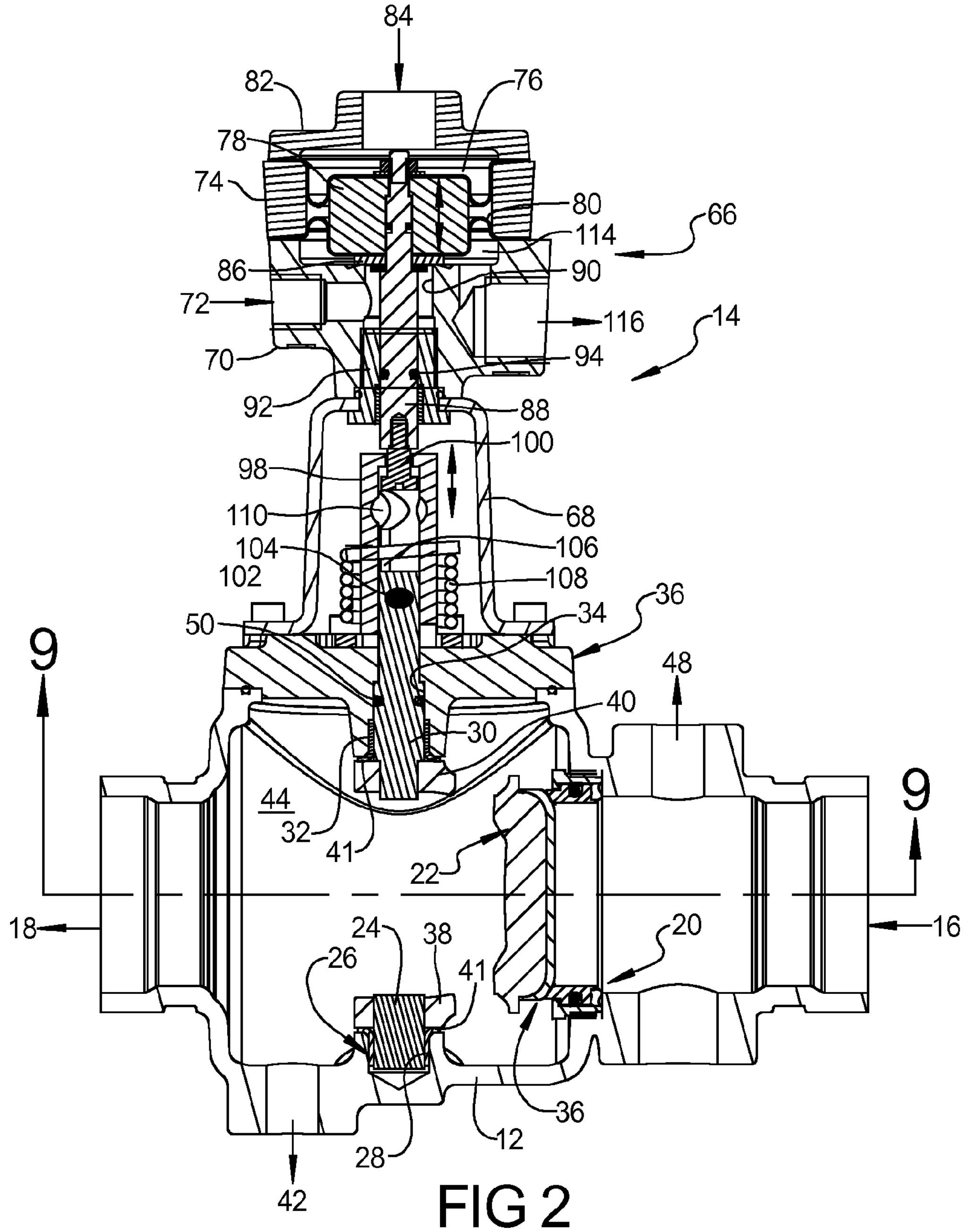
FIG. 2 is a cross-sectional view of the control valve of FIG. 1 in the closed and set position.

With reference to FIGS. 1 and 2, a differential actuated dry pipe control valve 10 will now be described. The control valve 10 includes a valve body 12 and an actuator mechanism 14. The valve body 12 includes a main system inlet 16 and a main system outlet 18 co-axially aligned with the inlet 16.

As shown in FIG. 2, the valve body 12 includes a dynamic seat assembly 20 against which a rotating plug assembly 22 can be disposed. The rotating plug assembly 22 is supported by an alignment shaft 24 which is received within a lower bushing 26 which is received within a bore 28 provided in the interior of the valve body 12. The rotating plug assembly 22 is also supported by an alignment shaft 24 which is received within a lower bushing 26 which is received within a bore 28 provided in the interior of the valve body 12. The rotating plug assembly 22 is also supported by an alignment shaft 30 which is received by an upper bushing 32. The upper bushing 32 is disposed within an aperture 34 provided in a cover 36 mounted to the valve body 12. The alignment shafts 24 and 30 are each attached to eccentric arm portions 38, 40, respectively, of rotating plug assembly 22. The rotating plug assembly 22 includes an elastomeric coated seal surface 38 that engages the dynamic seat assembly 20.

The valve body 12 includes a supervisory gas connection port 42 in communication with a valve chamber 44 which contains the rotating plug assembly 22. The valve body 12 also includes a main system drain connection port 46 and a water sensing connecting port 48, each of which are disposed upstream from the dynamic seat assembly 20.

Figure 4:
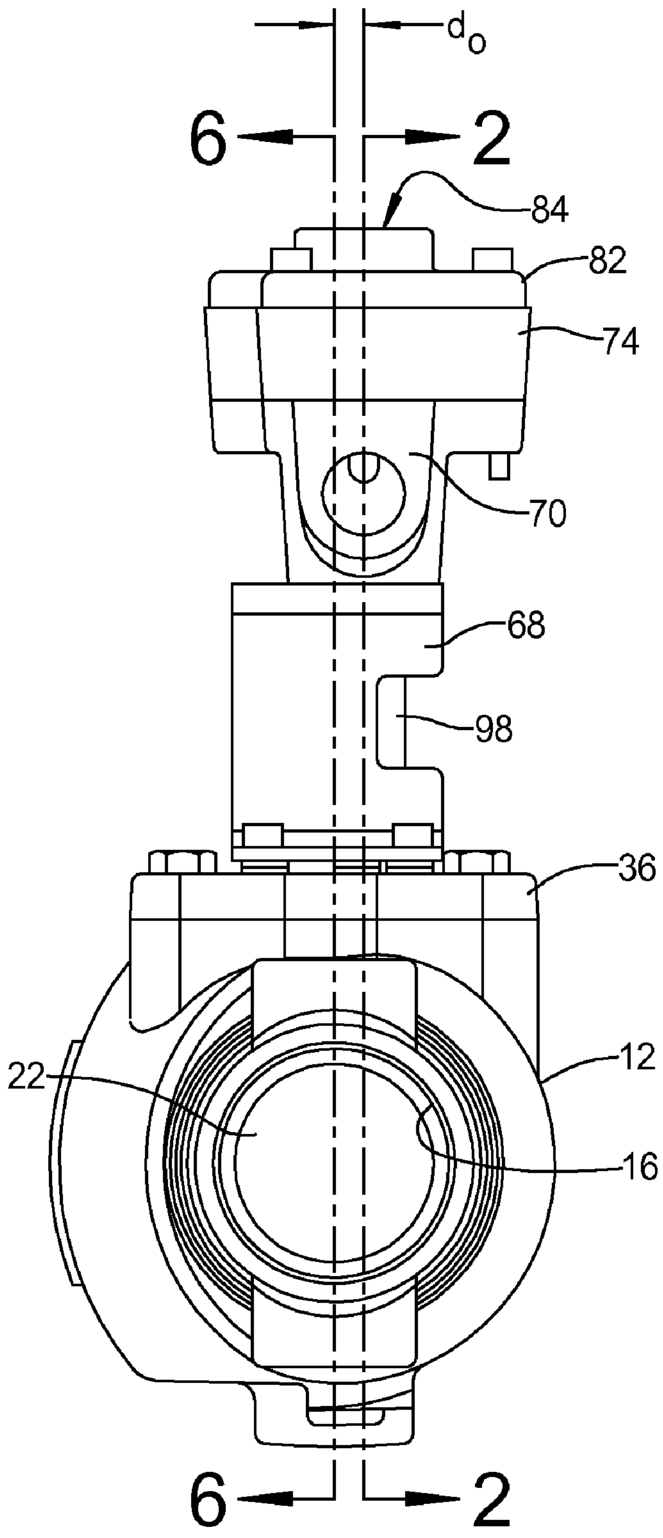
FIG. 4 is an end view of the control valve of FIG. 1 illustrating an offset rotational centerline of the valve relative to the annular seat, piping inlet and outlet, and with the plug in the closed position.
Figure 5:
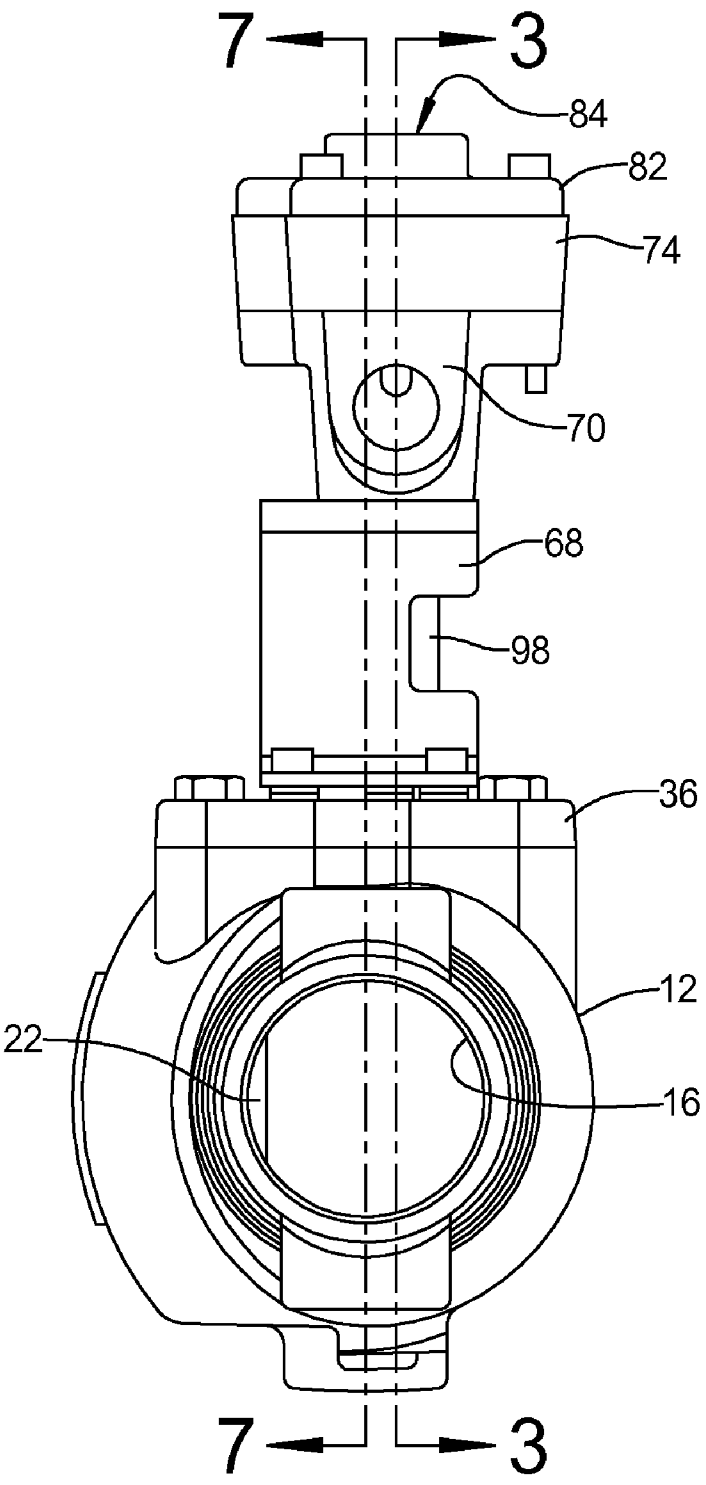
FIG. 5 is an end view similar to FIG. 4, illustrating the plug position in the open state.

The alignment shafts 24 and 30 that support the rotating plug 22 are aligned perpendicular to the axial center line of the valve through the flow centerline and offset a distance $d_o$ of approximately one quarter inch as indicated in FIG. 4. It should be understood that other offset dimensions can be utilized. The offset allows the plug 22 to pull away axially toward the outlet connection 18 away from the seat 22 when rotated or operated open to reduce friction and minimize scrubbing contact of the seat 20 and plug 22 during operation.

In order to accommodate low friction and resist corrosion, the alignment bushings 26 and 32 are construction of corrosion resistant stainless steel and aligned with low friction metallic and Teflon coatings that resist friction and wear and are corrosion resistant in liquid submerged atmospheres and are capable of resisting the high static thrust loads in the closed position of the valve and with full pressures applied. The bushings 26 and 32 also include a flange 41 to provide low friction against axial thrust forces of the rotating plug 22. The lower alignment bushing 26 is fully contained within the valve body and does not require a seal to prevent leakage, while the upper bushing 32 is exposed to atmosphere due to the rotating upper alignment shaft 30 that is connected to the actuator assembly 14. Accordingly, a dynamic O-ring seal assembly 50 is provided around the alignment shaft 30 to provide a seal between the aperture 34 of cover 36 and the alignment shaft 30. This O-ring seal 50 provides a low friction dynamic seal on the shaft 30 using the O-ring as a spring and a thermal plastic low friction seal ring directly contacting the rotating alignment shaft 30.

Figure 9:
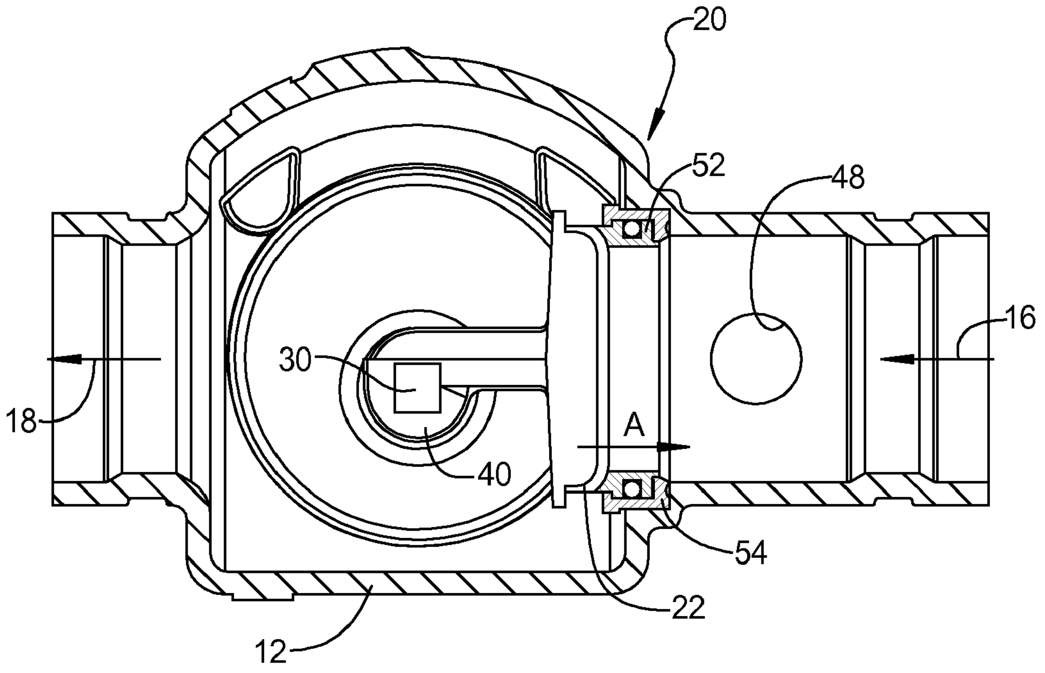
FIG. 9 is a cross-sectional view similar to FIG. 8 with the seat and plug components in the closed position.
Figure 10:
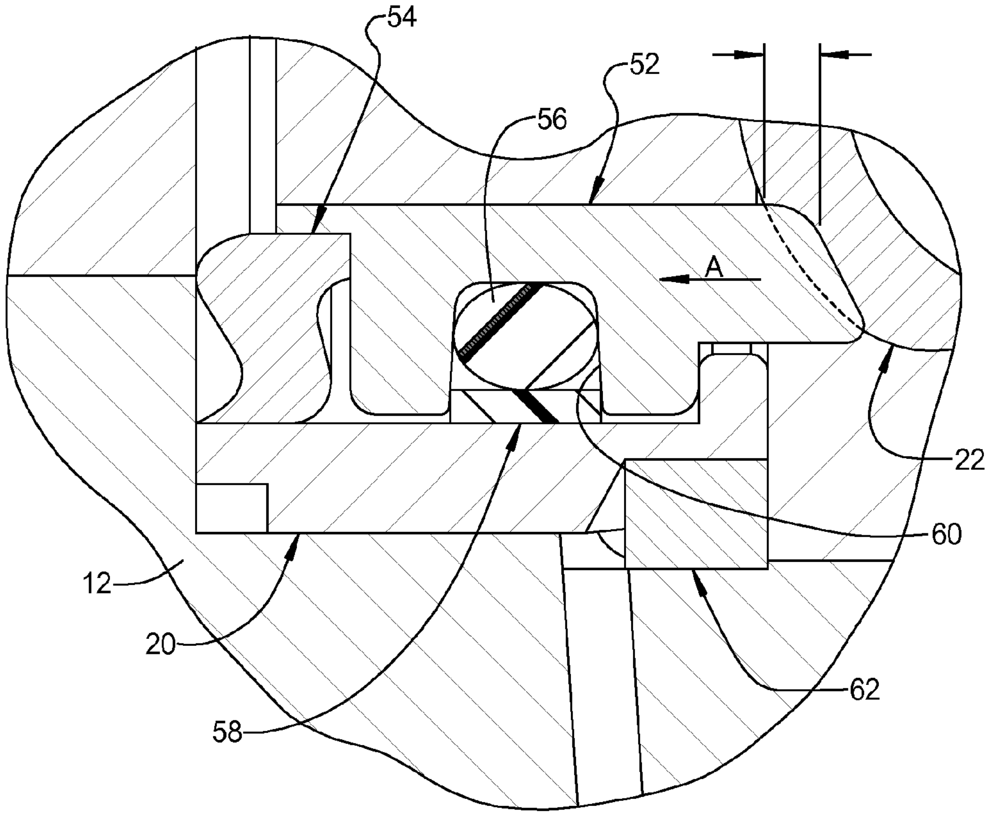
FIG. 10 is a close-up cross-sectional view of the dynamic seat in the closed position.

The dynamic valve seat assembly 22 is best shown in FIGS. 9 and 10 and includes a corrosion resistant seat 52 that can be formed of a metallic or non-metallic material. The seat 52 is free to move axially in the direction "A" a minimal distance to allow for rotating plug 22 to seat thereagainst and provide proper alignment. A wave spring 54 is provided for biasing the seal seat 52 in the axial direction against the plug assembly 22. In addition, a low friction O-ring 56 and low friction seal ring assembly 58 are provided within a recessed grove 60 provided in the exterior surface of the seal seat 52. A retainer 62 is provided to mechanically retain the seal seat 52 in position and to limit the axial movement of the seat 52. As the rotating plug 22 is aligned with the dynamic seat assembly 20, the seat 52 compresses the wave spring 54 slightly until the plug 22 is completely closed. The slight movement of the seat 52 during closing of the valve allows all sealing components to align axially and slightly compresses the seat 52 toward the wave spring 54. The seat 52 now is being forced toward the plug 22 by the wave spring 54 and has alignment potential based on the final position of the set plug position. When supply water pressure is applied, the seat 52 is forced by supply pressure toward the plug 22 to create increased seal potential. The retainer 62 is mechanically attached to the valve body 12 and retains the seat assembly 20 in position to allow a fixed shoulder for seat retention when the valve opens and provides the proper gap for seating the plug 22 and dynamic seat assembly 20 in the closed position of the valve.

The actuator assembly 14 includes a diaphragm control actuator assembly 66 which is mounted to the cover 36 by a support member 68. The diaphragm control actuator assembly 66 includes an actuator body 70 mounted to the support member 68 and including an inlet passage 72 which is connected to the water sensing connecting port 48 of the valve body 12. A piston housing portion 74 is connected to the actuator body 70 and defines a top cavity 76 for receiving a piston 78 and rolling diaphragm 80. A cover plate 82 is provided on top of the piston housing portion 74 and includes an actuator connection port 84 that connects to the supervisory gas connection port 42 of the valve body 12. The air pressure provided on the top side of the piston 78 and rolling diaphragm 80 forces the piston 78 downward against water seat 86 which is provided at the bottom of the top cavity 76 and is supported by the actuator body 70. The piston 78 is connected to a connecting rod 88 which extends through an aperture 90 in the actuator body 70. A connecting bushing 92 is providing in the aperture 90 of the actuator body 70 to slidably receive the connecting rod 88 therethrough. An O-ring seal 94 is provided in a recessed groove on the exterior surface of the connecting rod 88 and engages the connection bushing 92 in a sealed relationship. The connecting rod 88 attaches securely to the piston 78 and travels axially with movement of the piston 78.

The actuator assembly 66 is attached to the support member 68 that is open on two sides for exposure of the actuator coupling 98. The connecting rod 88 is attached to the actuator coupling 98 using a shoulder bolt 100 that allows slight axial movement for tolerance and includes a clearance so that when the actuator coupling 98 is moved axially to the point where it disengages from a latch plate 102, the actuator coupling 98 is free to rotate ninety degrees causing the outer alignment shaft 30 to rotate plug assembly 22 to the open position and allow liquid suppressant to flow through the valve body 12 toward the discharge piping system. The alignment shaft 30 and actuator coupling 98 are secured radially together with a pin 104 that is allowed to move axially in a slot 106 provided in the interior of the actuator coupling 98. As the actuator coupling 98 is pulled upward or outward to move off of the latch plate 102, a torsion spring 108 applies a torsion load to rotate the alignment shaft 30 and plug assembly 22 causing the valve 22 to open.

Setting holes 110 are provided within the actuator coupling 98 for insertion of a reset tool which is used to rotate the actuator coupling 98 to cause the valve to close and allows the actuator coupling 98 to be pushed slightly toward the latch plate 102 to lock the valve plug 22 against the dynamic seat assembly 20, thus closing the valve 10.

Figure 3:
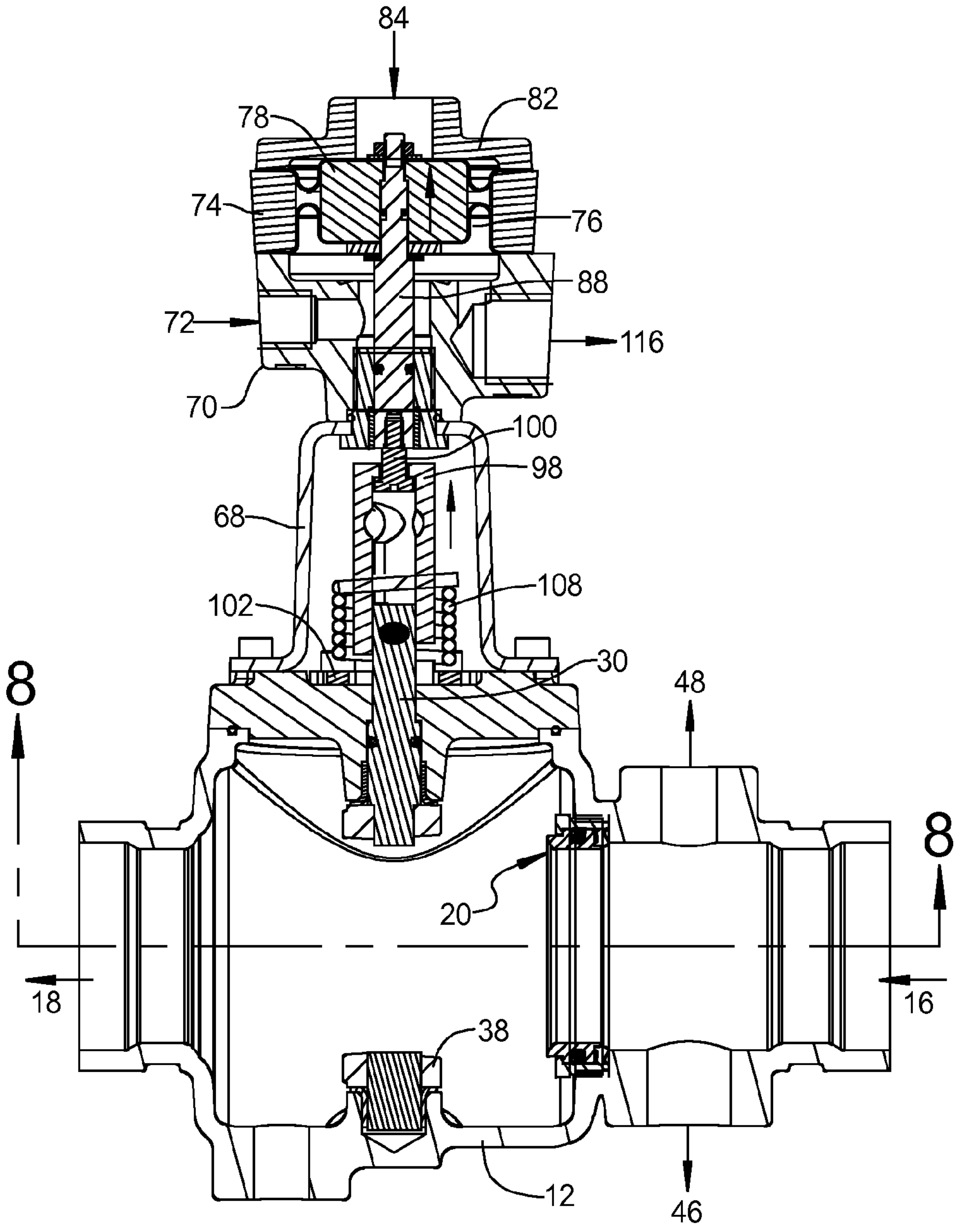
FIG. 3 is a cross-sectional view of the control valve of FIG. 1 in the open position.
Figure 6:
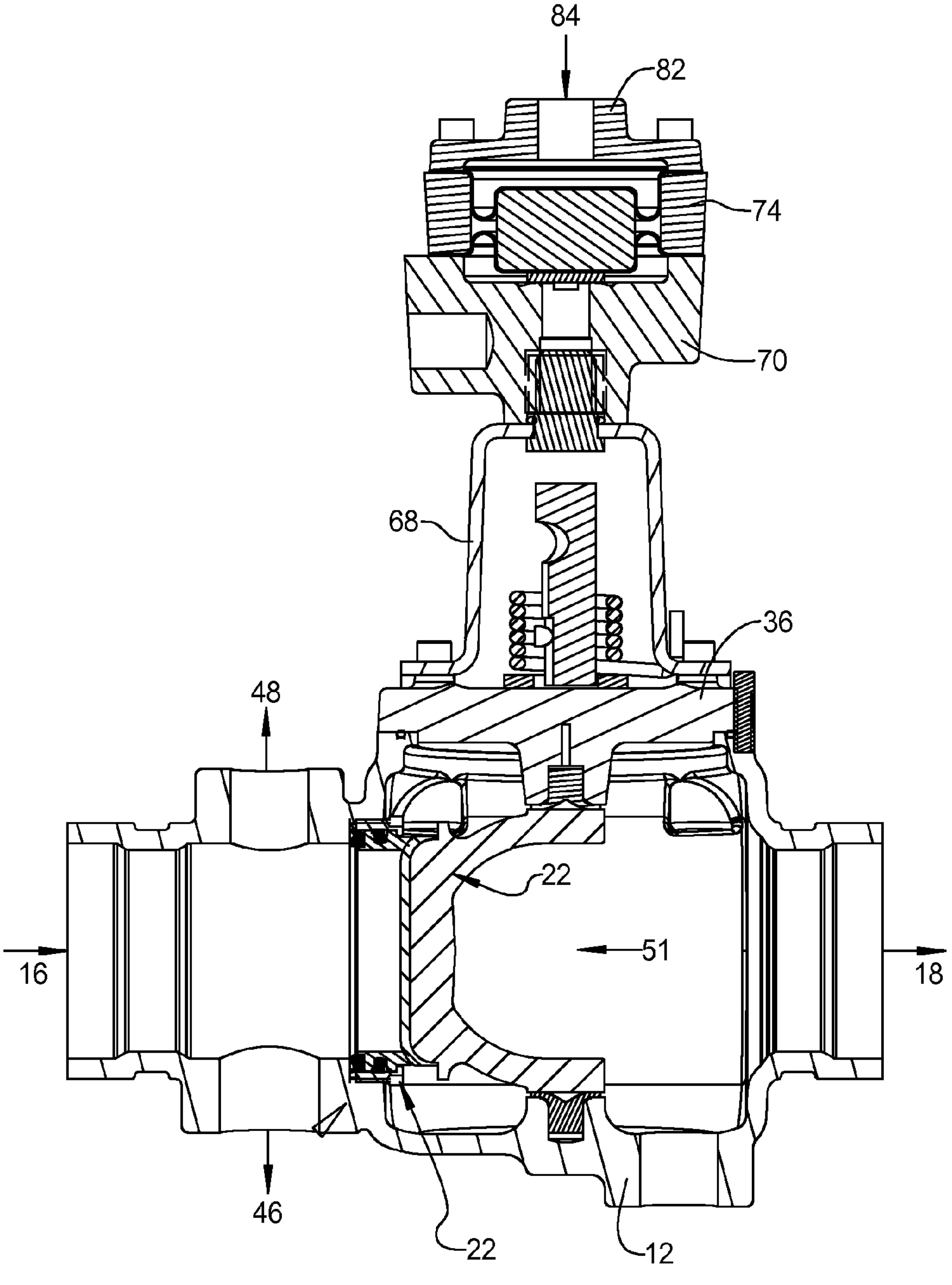
FIG. 6 is a cross-sectional view of the control valve taken in the direction of line 6-6 of FIG. 4 and illustrating the actuator coupling, piston and plug in the closed position.
Figure 7:
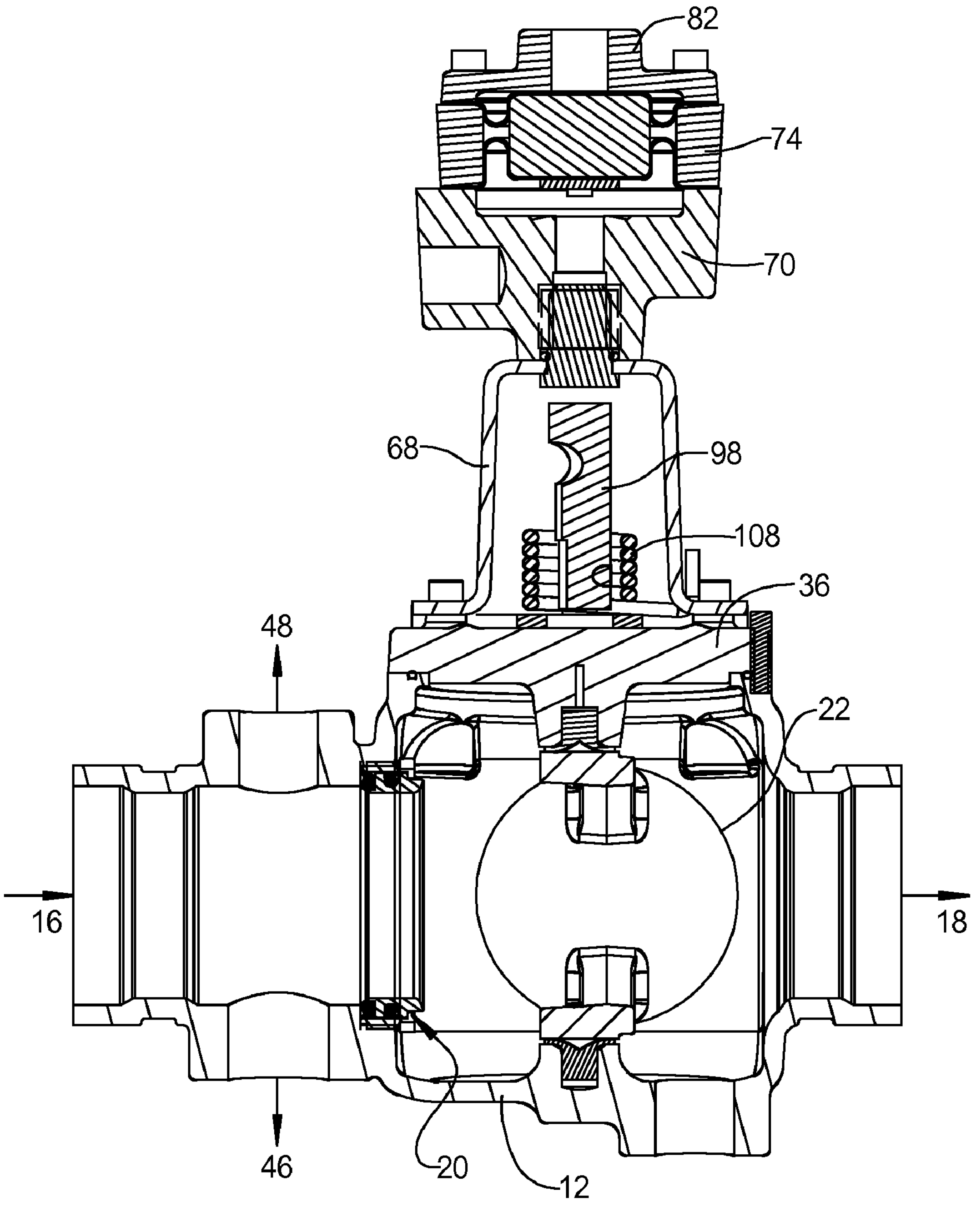
FIG. 7 is a cross-sectional view of the control valve similar to FIG. 6 and illustrating the position of all components in the open position.

FIG. 3 illustrates the piston 78 moved to the upper position within top cavity 76. The fixed connection between the connecting rod 88 and piston 78 causes the connecting rod 88 to move upward along with the piston 78 causing the shoulder bolt 100 to pull upward on the actuator coupling 98 which disengages the latch plate 102. When the latch plate 102 is disengaged, the torsion spring 108 causes rotation of the alignment shaft 30 which rotates the plug assembly 22 to an open position away from dynamic valve seat assembly 20. In the view shown in FIG. 3, the open valve plug assembly 22 is rotated in a direction above the plane of the drawing and therefore is not visible in this cross sectional view. It is noted that in the sectional view of FIG. 7, taken along line 6-6 of FIG. 4, the rotating plug assembly 22 can be seen moved away from the valve seat assembly 20. FIG. 6 shows a similar cross-sectional view to FIG. 7, with the valve plug 22 shown in the closed position seated against valve seat 20.

In operation, the control valve 10 is provided with pressurized gas at the actuator supervisory gas connection port 84 and is provided with pressurized water from the main system at the inlet 72 which is connected to the water sensing connecting port 48. The supervisory gas pressure acts on the top side of the piston 78 while the water pressure of the main system acts on the bottom side of the piston 78. The gas pressure forces the piston toward the water seat 86 when the desired supervisory gas pressure is reached. The water supply sensing line is then opened to set the water pressure at the inlet 72 of the actuator 14. When the supply liquid pressure enters the inlet of the valve, the pressure forces the dynamic seat toward the plug aligning both axially and radially with the spherical surface of the plug 22. The elastomer coating 38 on the plug 22 creates a seal between the plug 22 and the dynamic seat 20. The valve system 10 is now set.

The system discharge is connected to a piping system including multiple discharge fire sprinklers having fused plugs evenly spaced over a fire protected area of a building. The piping integrity is maintained using gas such as air or nitrogen at a predetermined pressure that is higher than the operating point of the Dry Pipe Valve at approximately a 5.5:1 ratio of supply liquid to gas pressure.

When one or more sprinklers are opened due to fire conditions, the system gas pressure lowers and when it reaches a point at which the air pressure is within a ratio of approximately 5.5:1 of the supply liquid pressure, the piston 78 is lifted off of the water seat 86 allowing supply liquid to enter the alarm chamber 114 disposed below the diaphragm 80. The alarm chamber 114 is in communication with an alarm connection port 116, which will be described in greater detail herein.

In the set condition the alarm connection part 116 is sealed off from the supply liquid by the integral seat of the actuator. In the occurrence of the valve opening, the alarm connection port 116 is open to liquid supply flow which provides flow of liquid to a mechanical alarm that is required for fire protection systems. This provides a local and/or remote alarm of the valve flowing fire suppressant or a fire condition in the protected area. Most all other valves of this type being of the differential dry pipe valve style require special seats and seal assemblies to allow for this alarm connection and function. The system of the present disclosure has the alarm function built into the actuator 14 so the system discharge supervisory gas can be accommodated directly on the down stream side of the plug 22 in place of requiring an intermediate chamber of atmospheric air and a special seat and seal assembly.

The movement of the piston 78 away from the water seat, causes the connecting rod 88 to move upward, thereby causing the actuator coupling 98 to disengage with the latch plate 102. This allows the torsion spring 108 to rotate the plug assembly 22, 90 degrees to an open position of the valve 10 providing instant liquid flow through the valve body 12 to the sprinkler discharge system. Also, as the piston 78 moves axially away from the water seat 86, of the actuator, the alarm connection port 116 is supplied with liquid suppressant that will flow outward to a mechanical alarm or electric pressure switch that provides external notification of water flow to the system.

The actuator 14 creates the function of the offset operation ratio between the supply pressure and the system supervision pressure being integral in the actuator 14 in place of the valve inlet and outlet chambers. This allows the valve body to be 5.5 times smaller than other industry dry pipe valves. As a result, this valve design provides a differential dry pipe sprinkler system control valve where the actuator 14 controls the opening and closing of the valve as well as the activation of an alarm.

Figure 8:
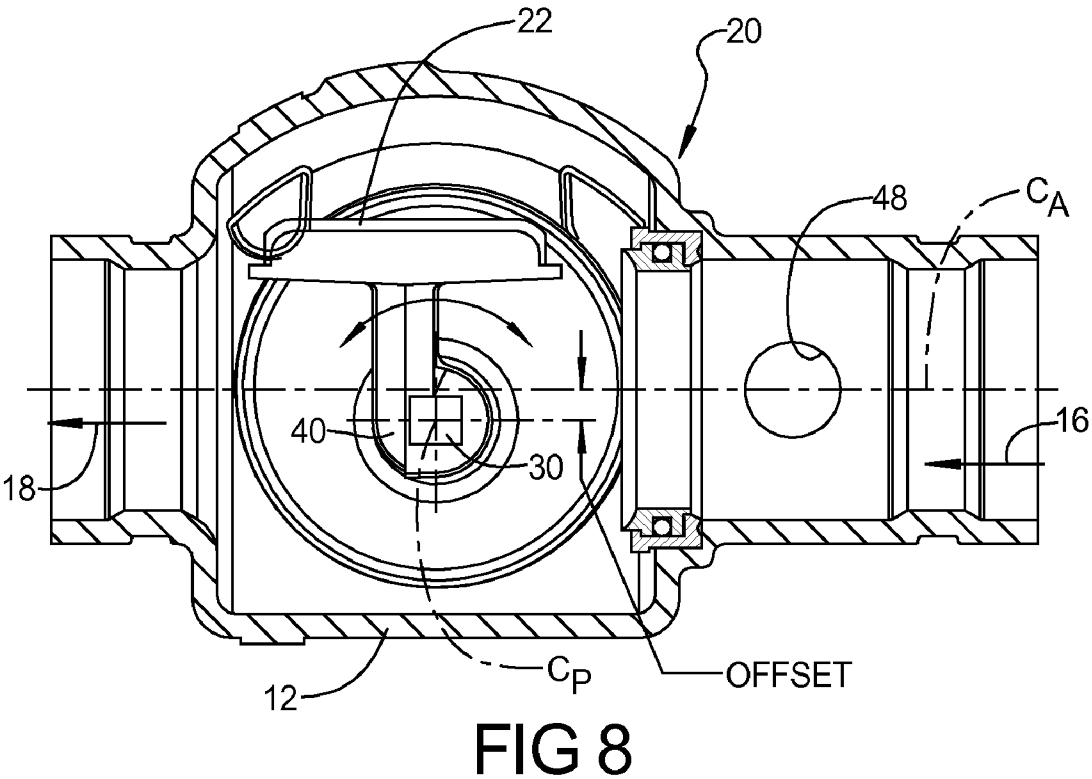
FIG. 8 is a cross-sectional take along line 8-8 of FIG. 3 and showing the valve plug and seat area in the open position.

The eccentric rotating plug assembly 22 includes an offset centerline $C_P$ of the shaft stem support versus the axial centerline $C_A$ of the seat 20 and pipe supply 16 as shown in FIG. 8. The offset of the plug 22 rotating axis prevents seat scrubbing on the plug 22 during opening and closing of the valve 10 for lower operating torque and longer life of the seat 20 and plug 22 surfaces.

As illustrated in FIG. 6, the plug 22 is designed with an open internal cavity 51. This provides for no obstruction of the flow when the valve is in the open position.

By providing a differential dry pipe control valve 10 for fire suppression sprinkler systems that utilize the actuator 14 for operation and the rotating plug design, the friction loss through the valve 10 is reduced substantially compared to conventional valves currently on the market. Also, the present control valve 10 allows for smaller valves to be applied to the same application due to the differential operation mechanism being incorporated in the actuator rather than within the valve body and seat. With the incorporation of low friction bushings, thermal plastic seals and the offset seat and plug engagement, the low torque required to open and close the valve 10 allows for larger pipe size differential dry pipe control valve designs than currently available.

Figure 11B:
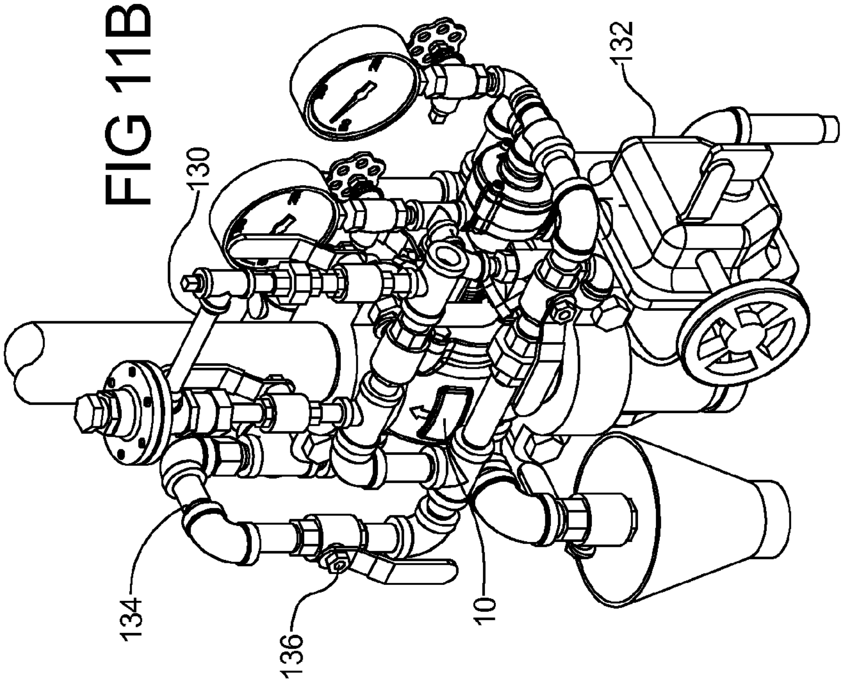
FIGS. 11A and 11B are perspective views of a valve and trim piping assembly with an auto drainer and pressurized discharge in which the control valve of the present disclosure can be utilized.
Figure 11A:
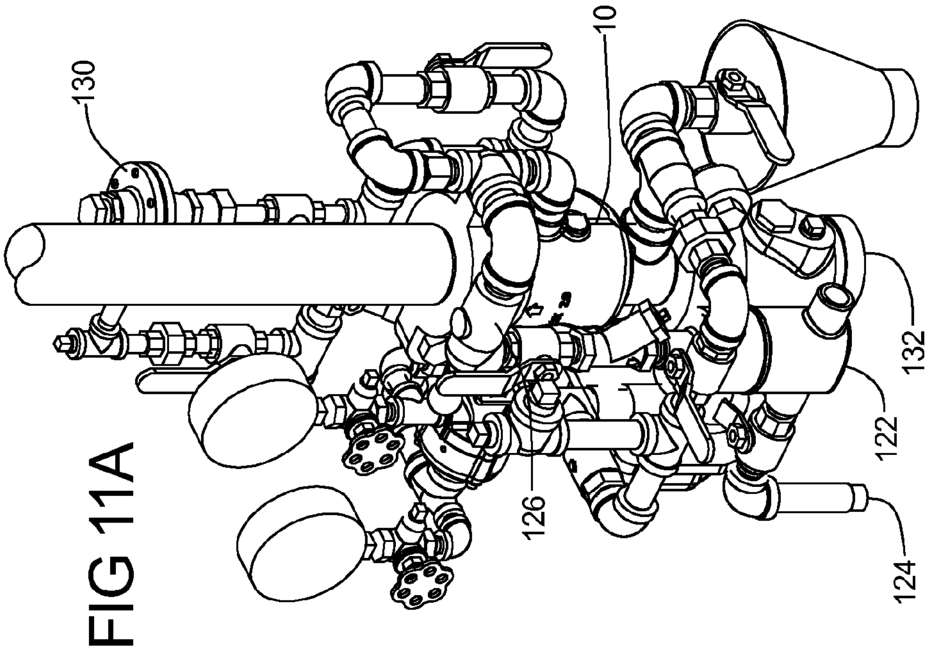

Exemplary valve trim arrangements are described in FIGS. 11A, 11B and 12A, 12B. FIGS. 11A, 11B illustrate one type of trim assembly where the system is always pressurized. For fire protection control valves a drip check valve or other means is required to monitor any leakage from the valve seat. In FIGS. 11A and 11B, the valve trim arrangement includes an automatic drain 122 that includes a hollow floating ball that is connected to a lever and seat and drain orifice. When liquid drains from the seat in the case of possible leakage, the internal ball float of the automatic drain 122 rises due to buoyancy and opens the drain orifice such that the pressurized gas or air in the system pushes the liquid out to drain 124. When the internal ball float drops with the liquid level, the seat resets without operating the actuator 14 of the valve 10. In the case of valve operation a drip check valve 126 is attached up stream of the automatic drain device 122. When full pressure supplying the system is applied due to valve operation, the drip check valve 126 includes a ball that is forced toward a seat due to liquid flow, pressure and velocity. This prevents liquid flow to the auto drain device 122 in a flowing condition.

Figure 12B:
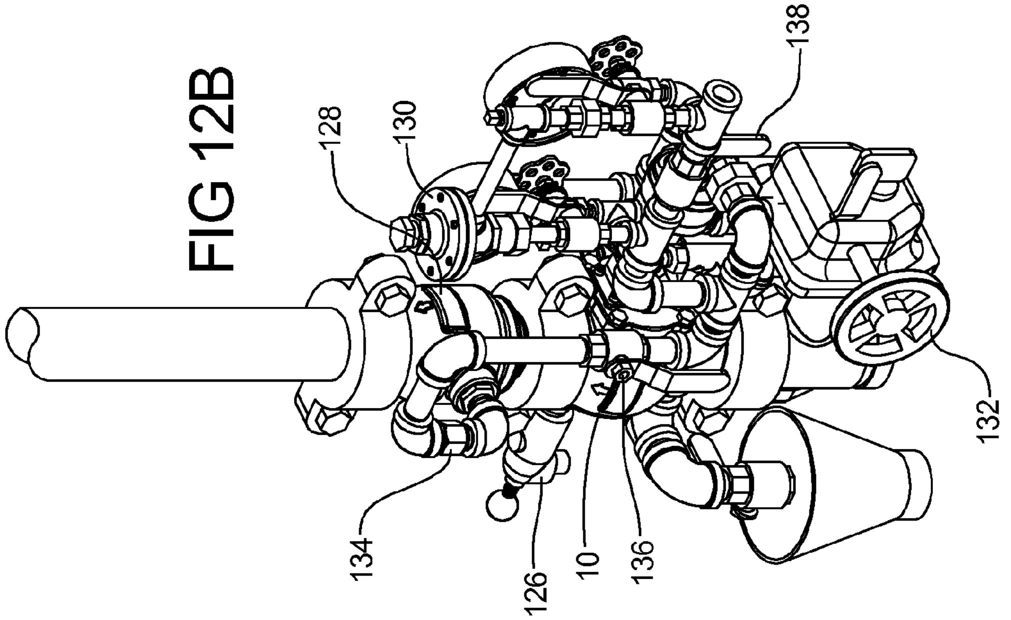
FIGS. 12A and 12B are perspective views of a valve and trim piping assembly with a system check valve and atmospheric pressure chamber in which the control valve of the present disclosure can be utilized.
Figure 12A:
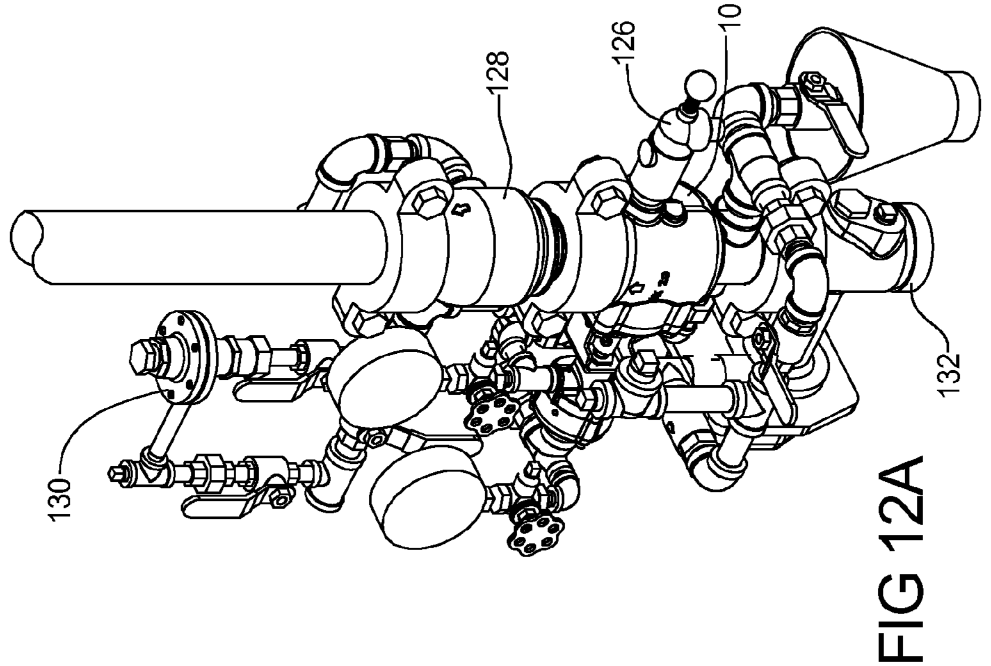

In FIGS. 12A and 12B the valve trim arrangement uses an additional check valve 128 in the system to provide an atmospheric space where a drain check valve 126 is allowed to drain off low pressure liquid that possibly leaks past the eccentric rotating plug and seat assembly. This allows visual inspection of leakage past the seal seat 20 and when the valve 10 opens for full flow of liquid, the drain check 126 closes due to the metal ball and seat as described above.

The trim assembly in FIGS. 11A, 11B and 12A, 12B include a restricted air or gas supply device 130 that regulates the flow of air or gas to the system supervisory gas supply so it will not overcome the discharge flow from an open sprinkler in a fire condition and allows the actuator to sense the opening of a sprinkler and open the valve 10. A supply control valve 132 is required to shut off the liquid supply in order to set the valve supervisory pressure and close the supply liquid line after a fire is extinguished and the system must be shut down. The restricted gas supply passes from the maintenance device 130 through a float check valve 134 that includes a plastic ball that allows gas to pass into the system and the ability to sense gas pressure in the actuator 14. When the system opens due to a fire condition the float check ball of the float check valve 134 rises with the water and shuts off the supply to the actuator 14. This prevents high pressure liquid from entering the actuator sensing chamber that could possibly apply pressure to the actuator 14 or reset the valve 10.

The sequence of setting the differential dry pipe control valve 10 for automatic operation is as follows: first, the supply control valve 58, is closed and the main drain 59 is opened to drain all liquid from the system. The rotating plug 22 is then closed externally using the setting tool and the latch coupler 98 is engaged with latch plate 102 (many fire protection dry valves on the market require disassembly of the cover to reset the valve). The system piping is then pressurized with gas by opening the gas supply valve 136 and opening the by-pass of the gas maintenance device 138 to fill the system with gas and pressurize the gas chamber 76 of the actuator 14. When the pressure reaches a desired set pressure, the water supply control valve 132 is opened to pressurize the liquid supply sensing inlet port 72 of the actuator 14. The drain valve 122 is then opened to bleed off air from the supply line. The alarm shut-off valve 142 is then opened. The valve 10 is now ready for automatic operation due to loss of supervisory pressure in the system discharge.

Figure 13:
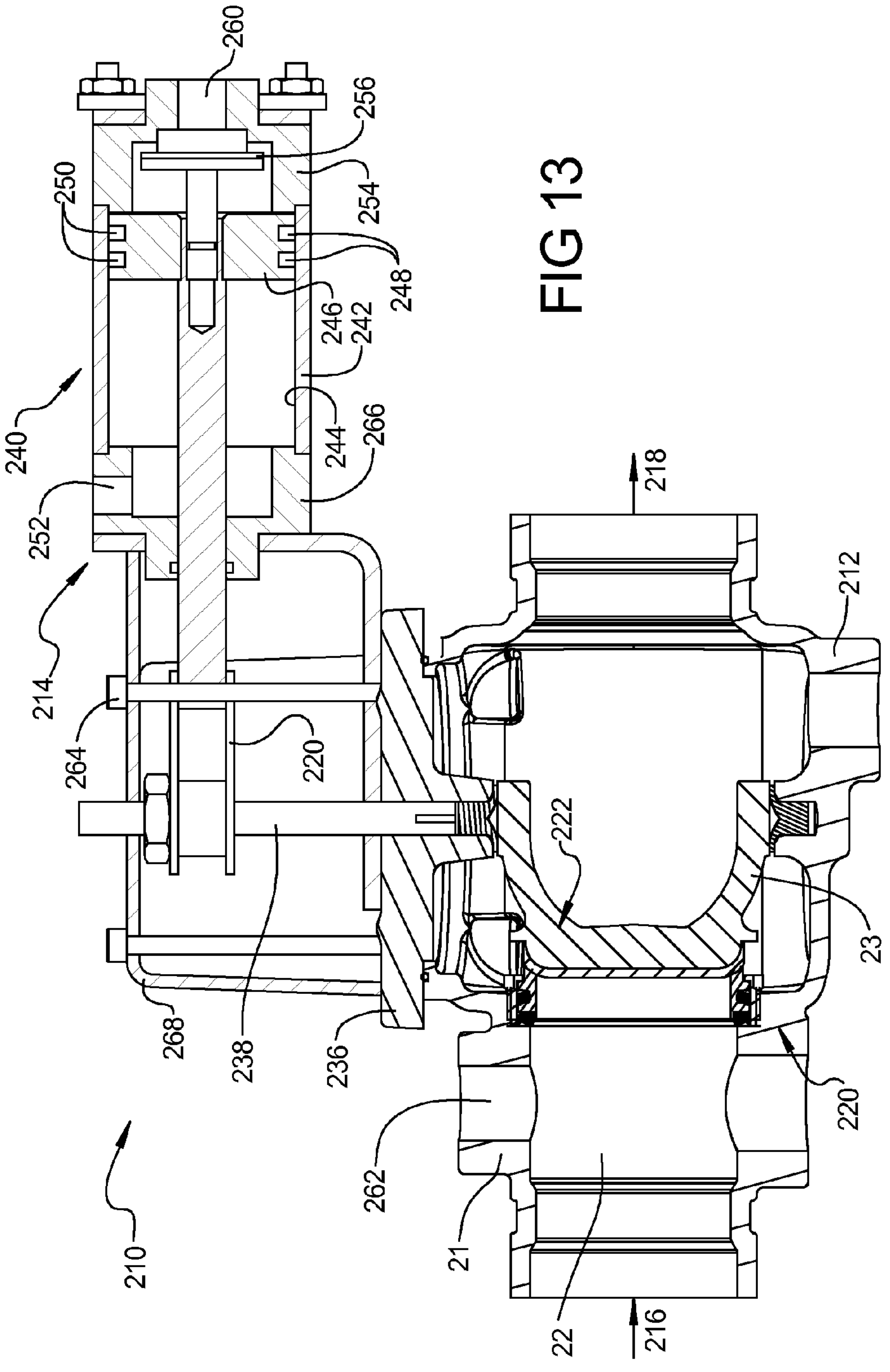
FIG. 13 is a cross-sectional view of a deluge valve assembly with a piston actuator according to the principles of the present disclosure.

According to an alternative embodiment, as shown in FIG. 13, a fire protection differential dry pipe control valve 210 is provided which employs an alternative actuator mechanism 214. The control valve 210 includes a valve body 212 having an eccentric rotary plug assembly 222 engaging a dynamic seat assembly 220 in the same manner as discussed above with respect to the control valve 10. The eccentric plug 222 is actuated by a rotating alignment shaft 230 which extends through an aperture provided in a cover 236 which is mounted to the valve body 212. The rotating alignment shaft 230 is rotatably supported by the cover 236 and by a support member 268.

The actuator 214 includes a piston actuator sub-assembly 240 which is disposed laterally to the side of the rotating alignment shaft 230. The piston actuator sub-assembly 240 includes an actuator housing 242 which defines an internal piston chamber 244 in which a piston 246 is reciprocatably received. The piston 246 is provided with one or more recessed grooves 248 which receive low friction dynamic O-ring seal assemblies 250 to provide a low friction sealed relationship between the piston 246 and piston chamber 244. Pressurized gas or air is supplied to the piston chamber 244 via supervisory air inlet passage 252 which acts to force the piston 246 in the direction toward water inlet seat 254. The water inlet seat 254 is engaged by a piston seal 256 which is fixedly attached to the piston 246. The piston seal 256 seals off the water inlet port 260 which is connected to the water sensing connecting port 262 which is provided in the valve body 212, and which supplies water to the inlet port 260 at a pressure equal to the pressure of the remaining system supply. The piston 246 is connected to a piston connecting rod 264 which extends through a support bushing 266 provided in the piston cylinder housing 244. The piston connecting rod 264 connects to a lever 270 which is connected to the rotating alignment shaft 230.

With the system as illustrated in FIG. 13, the actuator 214 is positioned perpendicular to and offset from the rotating alignment shaft 230 that rotates the rotating plug 222. The lever 270 is connected to the alignment shaft 230 and moves along with the piston 246 to cause rotation from zero to ninety degrees to open the valve 222 or close the valve. The lever 270 is connected to the piston connecting rod 264 by a pivot. The actuator provides a differential operating ratio of the piston actuator to supply pressure of approximately 3:1 in order to maintain the valve 210 closed in pressure surge and water hammer situations. When the set holding pressure of the actuator is released using system discharge gas or air, or supply liquid pressure, the actuator is powered open using the system supply liquid which moves the actuator piston 246 in the axial direction due to the loss of air pressure supplied to the inlet port 252. Thus, movement of the piston 246 causes rotation of the lever 270 which rotates the alignment shaft 230 which causes the plug valve 222 to open.

The deluge or flow control type valve 210 uses the same body 212 and eccentric rotating plug assembly 222 but the actuator 214 is a piston type where the piston 246 is perpendicular to the stem 230 of the rotating plug 222 and offset for leverage applied using a linkage system 220 to attach to the stem of the rotating plug. As the piston 246 moves axially, the stem 230 is rotated with the linkage assembly 270 through 90 degrees of rotation. The piston is powered closed using system discharge air or gas or also can use the supply liquid pressure. The piston end includes an elastomer seal 256 and corrosion resistant seat 254 that maintains an effective differential area ratio of approximately 2-3:1 in order to positively hold the piston 246 and valve 222 in the closed position until it is required to open based on a detected fire condition. Once the holding pressure is released the supply liquid pressure overcomes the forces and causes the piston 246 to move axially and open the plug valve 222 and allow discharge to the open fire sprinklers or other discharge devices.

What is claimed is:

1. A control valve for a dry pipe sprinkler system having a water supply and a supply of pressurized gas, comprising:
- a valve body having an inlet end and an outlet end and a fluid passage extending between said inlet end and said outlet end;
- a valve seat disposed in said valve body;
- a plug member rotatably supported in said valve body and movable between a closed position disposed against said valve seat and an open position spaced from said valve seat;
- a latch mechanism for releasably holding said plug member in said closed position, wherein said latch mechanism is disposed external to said fluid passage; and
- an actuator assembly including a piston disposed in a chamber, said chamber being supplied with the supply of pressurized gas on one side thereof and the water supply on a second side thereof, said piston being drivingly connected to said latch mechanism for disengaging said latch mechanism in response to a reduction in pressure of the supply of pressurized gas.

2. The control valve according to claim 1, wherein said inlet end and said outlet end of said valve body have a center axis and wherein said plug member rotates about an axis that is perpendicular to and laterally offset from said center axis.

3. The control valve according to claim 1, wherein said valve seat is axially biased by a spring.

4. The control valve according to claim 1, wherein said plug member is rotatably supported by a pair of bushings, one of said pair of bushings being disposed in a bore in said housing.

5. The control valve according to claim 4, wherein said pair of bushings includes a second bushing disposed in an aperture in a cover mounted to said valve body.

6. The control valve according to claim 1, wherein said valve body includes a water connecting port disposed between said inlet end and said valve seat, said water connecting port being connected to said actuator assembly for providing the water supply to said second side of said piston.

7. The control valve according to claim 1, wherein said valve body includes a gas connecting port disposed between said outlet end and said valve seat, said gas connecting port being connected to said actuator assembly for providing the supply of pressurized gas to said one side of said piston.

8. The control valve according to claim 1, wherein said plug member includes an elastomeric coating disposed on a surface thereof that engages said valve seat.

9. The control valve according to claim 1, wherein said piston is connected to said latch mechanism by a connecting rod fixedly connected to said piston, said latch mechanism including a latch plate engageable by an actuator coupling which is connected to said connecting rod, said actuator coupling being further connected to a plug shaft that is fixed to said plug member, said latch mechanism further comprising a spring rotatably biasing said plug shaft to rotate said plug member toward said open position.

10. The control valve according to claim 1, wherein said actuator assembly includes a fluid alarm connection in communication with said chamber.

11. The control valve according to claim 1, wherein said plug member includes a plug face adapted to engage said valve seat, said plug face being connected to a pair of pivot arms extending from a rear surface of said plug face.

12. A control valve for a dry pipe sprinkler system having a water supply and a supply of pressurized gas, comprising:
- a valve body having an inlet end and an outlet end and a fluid passage extending between said inlet end and said outlet end;
- a valve seat disposed in said valve body;
- a plug member supported in said valve body and movable between a closed position disposed against said valve seat and an open position spaced from said valve seat;
- a latch mechanism for releasably holding said plug member in said closed position, said latch mechanism being disposed external to said fluid passage; and
- an actuator assembly including an actuator chamber, said actuator chamber being supplied with the supply of pressurized gas on one side thereof and the water supply on a second side thereof, said actuator being connected to said latch mechanism by a connecting rod for disengaging said latch mechanism in response to a reduction in pressure of the supply of pressurized gas, wherein said latch mechanism includes a latch plate engageable by an actuator coupling which is connected to said connecting rod, said actuator coupling being further connected to a plug shaft that is fixed to said plug member, said latch mechanism further comprising a spring rotatably biasing said plug shaft to rotate said plug member toward said open position when said actuator coupling is disengaged from said latch plate.

13. The control valve according to claim 12, wherein said inlet end and said outlet end of said valve body have a center axis and wherein said plug member rotates about an axis that is perpendicular to and laterally offset from said center axis.

14. The control valve according to claim 12, wherein said valve seat is axially biased by a spring.

15. The control valve according to claim 12, wherein said plug member is rotatably supported by a pair of bushings, one of said pair of bushings being disposed in a bore in said housing.

16. The control valve according to claim 12, wherein said valve body includes a water connecting port disposed between said inlet end and said valve seat, said water connecting port being connected to said actuator assembly for providing the water supply to said actuator chamber.

17. The control valve according to claim 12, wherein said valve body includes a gas connecting port disposed between said outlet end and said valve seat, said gas connecting port being connected to said actuator assembly for providing the supply of pressurized gas to said actuator chamber.

18. The control valve according to claim 12, wherein said actuator assembly is connected to said latch mechanism by an actuator lever.

19. The control valve according to claim 12, wherein said actuator assembly includes a fluid alarm connection in communication with said actuator chamber.

20. The control valve according to claim 12, wherein said plug member includes a plug face adapted to engage said valve seat, said plug face being connected to a pair of pivot arms extending from a rear surface of said plug face.

21. A control valve for a dry pipe sprinkler system having a water supply and a supply of pressurized gas, comprising:
- a valve body having an inlet end and an outlet end;
- a valve seat disposed in said valve body;

a plug member rotatably supported in said valve body and movable between a closed position disposed against said valve seat and an open position spaced from said valve seat;

an actuator assembly including an actuator chamber, said actuator chamber being supplied with the supply of pressurized gas on one side thereof and the water supply on a second side thereof, said actuator assembly including an alarm connection port in direct communication with said actuator chamber so as to be supplied with water when said actuator assembly is activated; and a latch mechanism for releasably holding said plug member in said closed position, said actuator assembly being connected to said latch mechanism for disengaging said latch mechanism in response to a reduction in pressure of the supply of pressurized gas.

* * * * *

UNITED STATES PATENT AND TRADEMARK OFFICE

CERTIFICATE OF CORRECTION

PATENT NO. : 8,177,189 B2
APPLICATION NO. : 11/556847
DATED : May 15, 2012
INVENTOR(S) : Eldon D. Jackson et al.

It is certified that error appears in the above-identified patent and that said Letters Patent is hereby corrected as shown below:

Title Page, item 57

In the Abstract:

At line numbers 17-18, "an open system Deluge valve or closed system Preaction valve" should be --an open system deluge valve or closed system preaction valve--.

In the Specification:

At column 4, line number 39, "phragm an supply" should be --phragm and supply--.

At column 5, line number 7, "take along line" should be --taken along line--.

At column 6, line number 4, "are construction of" should be --are constructed of--.

At column 6, line number 31, "recessed grove 60" should be --recessed groove 60--.

At column 7, line number 1, "is providing in the aperture 90" should be --is provided in the aperture 90--.

Signed and Sealed this
Tenth Day of July, 2012

David J. Kappos

*Director of the United States Patent and Trademark Office*